Figure 1A:
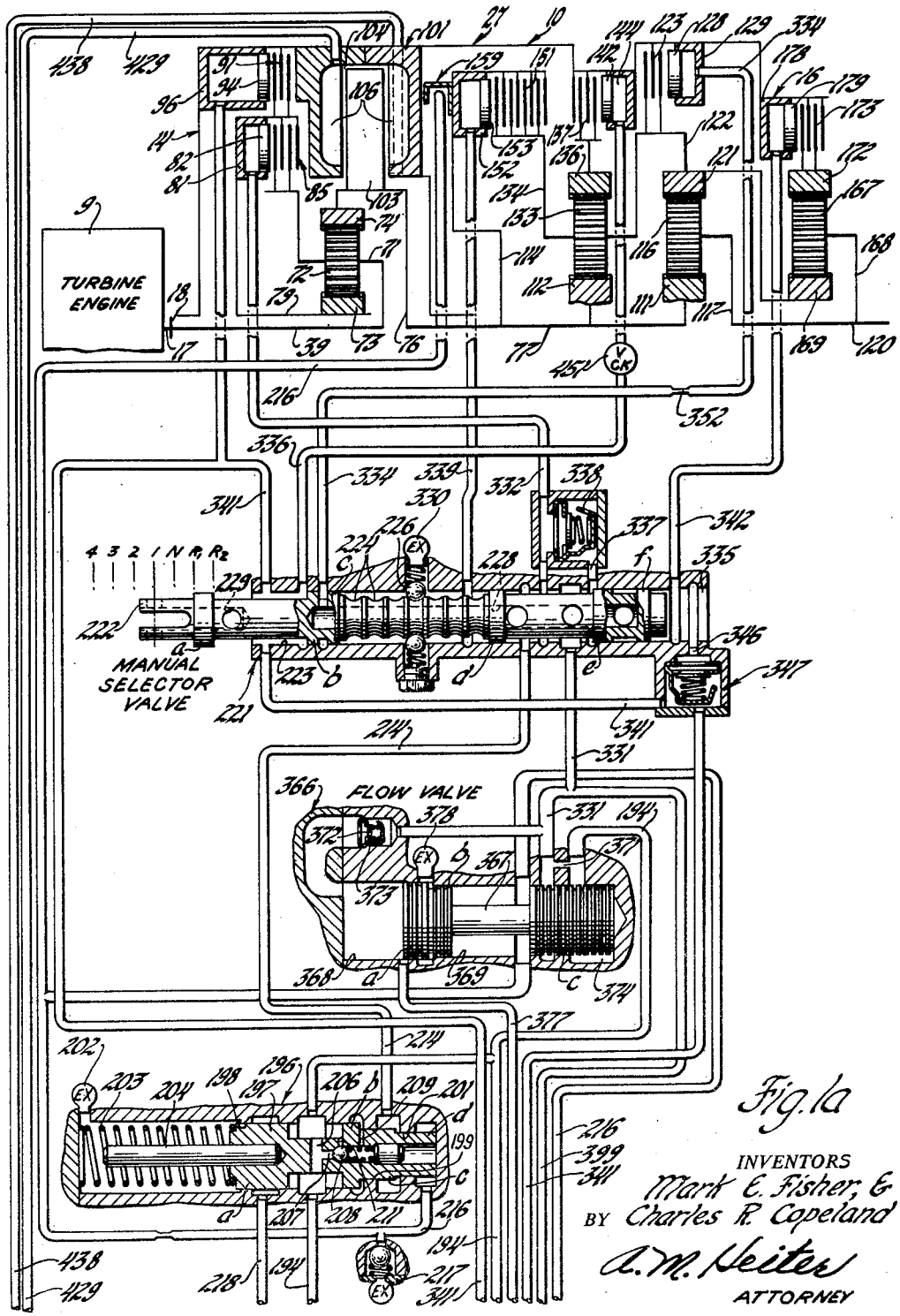

INVENTORS
Mark E. Fisher, &
BY Charles R. Copeland
ATTORNEY

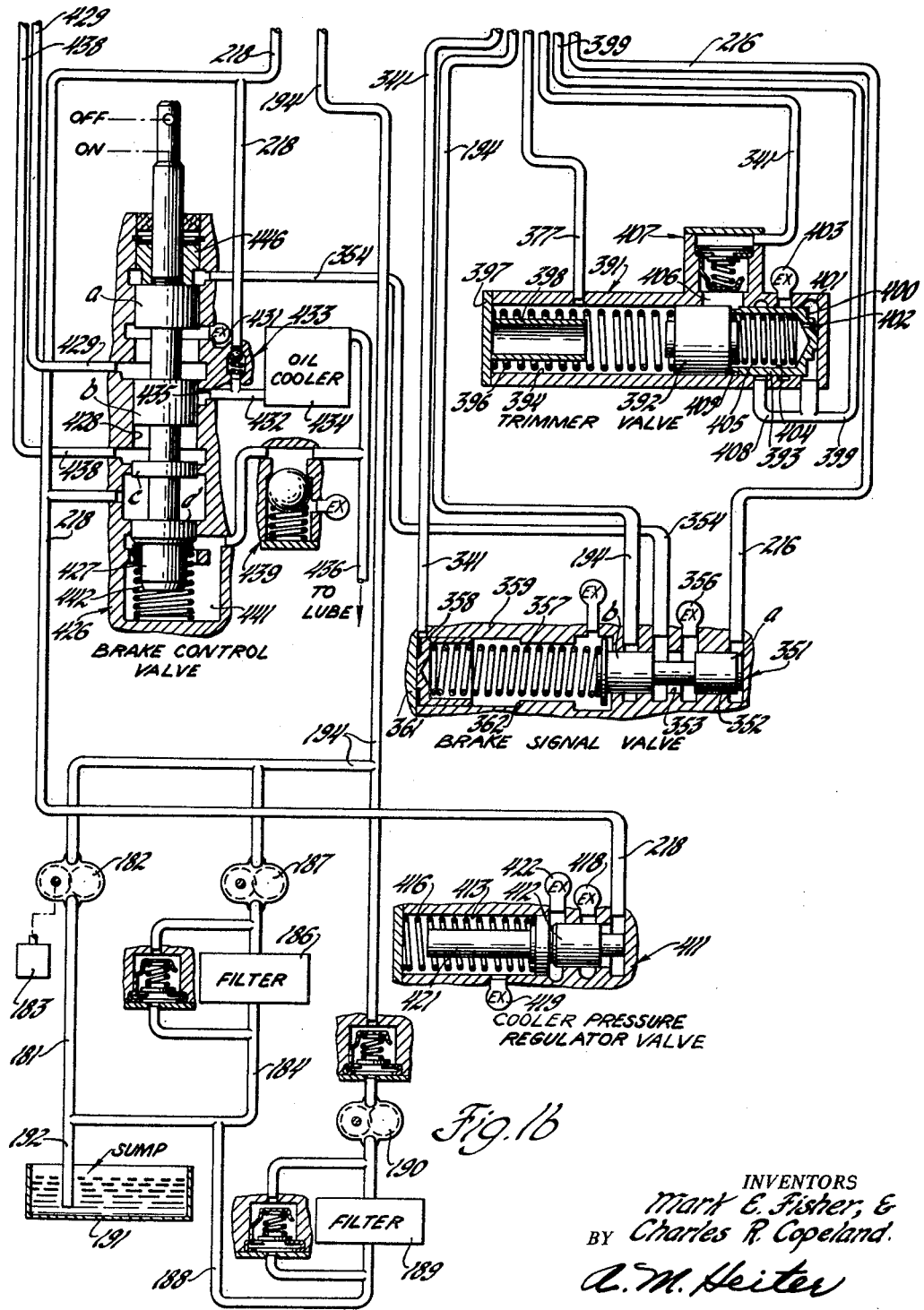

United States Patent Office 3,181,677
Patented May 4, 1965

3,181,677
TRANSMISSION
Mark E. Fisher, Carmel, and Charles R. Copeland, Acton, Ind., assignors to General Motors Corporation, Detroit, Mich., a corporation of Delaware
Filed Nov. 3, 1960, Ser. No. 67,032
12 Claims. (Cl. 192—4)

This invention relates to a power plant and particularly the combination of a turbine engine and a hydraulically controlled multiratio transmission.

Power plants, and particularly those employing gas turbine engines, will overspeed on a substantial reduction or disconnection of the load. This overspeed condition will occur even though the throttle is quickly closed when the load is removed, since in gas turbine engines, particularly those having a separate power turbine, there is little internal friction. The residual gas flow will suddenly increase the speed to values dangerous to the engine and transmission. In a vehicle power plant having a gas turbine engine and a multiratio transmission, dangerous overspeed conditions may be caused during downhill operation of the vehicle, by failure of the engine governor, or by the slow response of the engine governor on a shift in which there is a time interval between disengagement of one ratio and engagement of the next ratio.

To prevent overspeed of the power plant, the transmission has a hydrodynamic brake automatically actuated in response to engine output speed above the normal maximum operating speed to retard the engine output.

The object of the invention is to provide a power plant combination including a gas turbine engine, a multiratio transmission with a hydrodynamic brake and a governor response to input speed to automatically actuate the hydraulic brake to limit engine speed.

Another object of the invention is to provide a transmission having a hydrodynamic brake and a governor to automatically actuate the hydrodynamic brake to limit transmission speed.

These and other objects of the invention will be more apparent from the following description and drawings illustrating the preferred embodiments of the invention.

FIGURES 1a and 1b, when arranged with FIGURE 1a above FIGURE 1b, diagrammatically show the transmission drive train and the hydraulic control system.

The invention is illustrated in a power plant having a turbine engine 9, a transmission 10 and a hydrodynamic brake 101. The gas turbine engine may have a compressor turbine and a power output turbine as illustrated in a copending application S.N. 67,069, filed November 3, 1960, by William M. Spreitzer et al., now Patent No. 3,093,010 issued June 11, 1963.

The transmission drive train consists of a multiratio gear unit having a two-speed unit 14 and a three-speed and reverse unit 16, shown diagrammatically in FIGURE 1a. Referring to FIGURE 1a, the engine shaft 17 is connected by a coupling 18 to the input shaft 39.

The input shaft 39 is connected to the carrier 71 of the two-speed gear unit 14. Carrier 71 has a plurality of planetary pinions 72 meshing with a sun gear 73 and a ring gear 74 which is connected by a hub 76 to the intermediate shaft 77. The sun gear 73 is connected by the connecting member 79 which has a cylinder 81 for the clutch piston 82. The piston 82 engages the clutch 85 having alternate plates splined to the carrier 71 and intermediate plates splined to the member 79 to provide a connection between the carrier and sun gear. The cylinder 81, piston 82 and clutch 85 provides a fluid actuated ratio establishing device which on the supply of fluid to the cylinder 81 connects the sun gear 73 to the carrier 71 to lock up the planetary gear unit 14 to establish or engage direct drive which is the lower ratio in this two-speed transmission unit. Piston 82 is retracted by conventional springs.

The brake 91 consists of a plurality of plates with alternate plates splined to the connecting member 79 and intermediate plates splined to the transmission housing 27. The piston 94 is located in a cylinder 96 formed in the housing 27. On the supply of fluid to the cylinder 96, the piston 94 engages the brake 91 to hold the connecting member 79 and sun gear 73 and thus this assembly of the cylinder, piston and brake provides a fluid actuated ratio establishing device for overdrive or high in the two-speed unit 14. Piston 94 is retracted by suitable springs.

A fluid dynamic brake 101 is located adjacent the planetary gear unit 14 and has a rotor having a plurality of transverse blades 103 fixed to the hub 76 directly connected to the intermediate shaft 77. The housing 27 is formed to provide a chamber 104 surrounding the blades 103 having stationary or stator blades 106 on each side of the blades 103.

The intermediate shaft 77 is connected to a first sun gear 111 and a second sun gear 112 and a connecting member 114. The sun gear 111 meshes with a plurality of planetary pinions 116 mounted on a carrier 117 connected to the output shaft 120. The ring gear 121 which forms a part of the unitary carrier and gear assembly 122 meshes with pinions 116 and is retarded by the brake 123 to provide low ratio in the gear unit 16. The brake 123 has a plurality of plates, with alternate plates splined to the ring gear 121 and intermediate plates splined to the housing 27, located between a fixed abutment and a piston 128. The piston 128 located in a cylinder 129 is actuated by fluid under pressure to engage the brake. The piston 128, cylinder 129 and brake 123 provide a fluid actuated ratio establishing device braking ring gear 121 to establish low forward ratio in the three-speed unit 16.

The intermediate gear set has pinions 133 mounted on a carrier portion 134 of the carrier assembly 122 and meshing with the sun gear 112 on the intermediate shaft 77 and the ring gear 136 which may be retarded by the brake 137 to provide intermediate drive. The brake 137 consists of a plurality of plates with alternate plates splined to the ring gear 136 and intermediate plates splined to the frame 27, located between a fixed abutment and a piston 142. When fluid is admitted to the cylinder 144, the piston 142 moves to engage the brake 137. This assembly fluid actuated ratio establishing device brakes ring gear 136 and provides intermediate ratio.

High ratio is provided by the clutch assembly 151 which is mounted on the connecting member 114 on the intermediate shaft 77. The member 114 is shaped to provide a cylinder 152 for the piston 153. The clutch has a plurality of plates with alternate plates splined to the carrier 134 and intermediate plates splined to the connecting member 114. The plates are located between a fixed abutment and the piston 153. A retraction spring normally biases the piston to the disengaged position. The cylinder 152, piston 153 and clutch 151 provides a fluid actuating ratio establishing device effective to establish high or direct drive ratio in the three-speed unit.

The Pitot tube governor 159 has an annular can secured to the member 114. The fluid in the annular can rotates with the can and impinges against the Pitot tube to provide a governor pressure proportional to the speed of the intermediate shaft 77 in governor line 216.

The reverse ratio gear has a plurality of planetary pinions 167 mounted on a carrier 168 splined to the output shaft 120 which mesh with sun gear 169 connected to the carrier assembly 122 and a ring gear 172 which may be retarded by the brake 173. Brake 173 consists of a plurality of plates with alternate plates splined to the ring gear 172 and intermediate plates splined to the housing 27 and located between a fixed abutment and piston 179. When fluid is supplied to the cylinder 178 formed in the housing, the piston 179 moves to engage the brake. This fluid actuated ratio establishing device is operative to brake ring gear 172 to establish reverse ratio in the three-speed unit. This ratio gearing is shown in more detail in application S.N. 795,072, filed February 24, 1959, by Mark E. Fisher and Robert H. Schaefer, now Patent No. 3,138,969 issued June 30, 1964.

Each of the ratios in the three-speed unit 16, low, intermediate, high and reverse, may be combined with direct and overdrive in the two-speed unit 14 to provide six forward ratios and two reverse. However, in the control system described below and for the particular usage contemplated, only four forward ratios and two reverse ratios are provided as shown in the following table.

|    | Two-speed Unit 14 | | Three-Speed Unit 16 | | | | S2 |
|----|---|---|---|---|---|---|---|
|    | Direct Drive Line 332 | Over Drive Line 341 | High Line 339 | Int. Line 336 | Low Line 334 | Rev. Line 342 | Line 214 |
| 4  |   | X | X |   |   |   | X |
| 3  | X |   | X |   |   |   | X |
| 2  | X |   |   | X |   |   | X |
| 1  | X |   |   |   | X |   | X |
| N  | X |   |   |   |   |   |   |
| R1 | X |   |   |   |   | X |   |
| R2 |   | X |   |   |   | X |   |

Hydraulic controls

The transmission sump 191 provides a source of fluid for lubricating the transmission drive train and operating the transmission controls. Fluid is conducted from the sump through the pump inlet line 192 to three pumps.

Inlet line branch 181 is connected to auxiliary pump 182 driven by an auxiliary means 183, such as an electric motor or the turbine engine. The inlet branch 184 is connected through a bypass filter 186 to the front pump 187 which is driven by the input shaft 39 to supply fluid to main line 194. The inlet branch 188 is connected through bypassed filter 189 to the rear pump 190 which is driven by the output shaft 120 to supply fluid to main line 194.

The manual selector valve 221, the flow valve 366, the regulator valve 196, the trimmer valve 391 are substantially the same and function similar to the valves in the above application S.N. 795,072.

The pumps supply fluid to main line 194. The pressure in main line 194 is controlled by the regulator valve 196 which has a valve element 197 having lands $a$, $b$, $c$ and $d$. The lands $a$ and $b$ are located in a large bore 198, land $c$ in an intermediate bore 199, and the land $d$ in a small bore 201. The end of the bore 198 beyond land $a$ has an exhaust 202 to prevent accumulation of fluid in the spring chamber portion of the bore. A spring 203 in the bore 198 biases valve element 197 toward the end having small bore 201. The pin 204 limits compression of the spring 203. The line 194 is connected to the bore 198 between the lands $a$ and $b$ at all times and also through valve element 197 via port 206 and passage 207 having a one-way check valve 208 to passage 209 so that main line pressure may act on the unbalanced area of land $b$. The bypass 211 is a small orifice bypassing the check valve in passage 207. This arrangement permits a rapid flow of fluid from the main line to act on the unbalanced area of the land $b$ but limits the return flow to a reduced rate to damp any tendency toward cyclic changes in pressure. A signal line 214 supplying main line pressure in positions of a manual selector valve as shown in column S2 of the above table and described below is connected to the bore 199 to act on the unbalanced area of land $c$ to decrease the line pressure during certain phases of transmission operation. Governor pressure supplied to the Pitot governor 159 through the governor line 216 is connected to the end of the bore 201 to act on the end of the land $d$ to decrease the main line pressure with increasing speed. The governor pressure in line 216 is limited by the relief valve 217 which limits the governor pressure and thus limits the reduction in main line pressure due to increasing speed. Excessive main line pressure will cause the valve element 197 to move left compressing spring 203 and exhausting excess fluid to the brake supply line 218.

The manual selector valve 221 has a valve element 222 having lands $a$, $b$, $c$, $d$, $e$ and $f$ located in a bore 223 of uniform diameter. The valve is movable through seven positions which are fourth ratio through first ratio drive, neutral and reverse one and reverse two, determined by the seven annular grooves 224 located between the lands $c$ and $d$. The spring loaded ball detent 226 engages grooves 224 to retain the valve in each of these positions. The space between the lands $b$ and $c$, $d$ and $e$ and $e$ and $f$ are interconnected by the bore 228 extending through the valve element. The space between the lands $a$ and $b$ is connected to exhaust by a bore 229.

With the manual selector valve 221 in the first ratio position shown, the ratio supply line 331 which supplies fluid at main line pressure as modified by the flow controlled regulator valve 391 is connected to the direct drive line 332 to engage the clutch 85 and to the signal line 214, to control the regulator valve 196 and through bore 228 and between the lands $b$ and $c$ to low line 334 to engage the low ratio brake 123 of the three-speed unit 16. The other lines are connected to exhaust, lines 341 and 336 at the left end of bore 223, line 339 at exhaust 330 and line 342 at the right end 335 of bore 223. When the valve 222 is moved to the second ratio position, the connection of the ratio supply line 331, signal line 214 and the direct drive line 332 remains the same. The low ratio line 334 however is connected between the lands $c$ and $d$ to exhaust 330 while the main line is connected through the bore 228 between the lands $b$ and $c$ to the intermediate line 336. In the third ratio position the valve 221 connects the ratio supply line 331 between the lands $e$ and $f$ through the bore 228 to the space between the lands $d$ and $e$ and the direct drive line 332, signal line 214 and the high clutch line 339. The bypass line 337 though supplied from line 331 is blocked by check valve 338. The low ratio line 334 and the intermediate ratio line 336 are connected to exhaust 330. In the fourth ratio position ratio supply line 331 is connected by the space between the lands $e$ and $f$, bore 228 and the space between the lands $d$ and $e$ to the signal line 214 and the high ratio line 339 and through bore 228 to the space between the lands $b$ and $c$ to the overdrive line 341. The low and intermediate lines 334 and 336 remain connected to exhaust 330. In neutral ratio supply line 331 is connected between the lands $d$ and $e$ to the direct drive line 332, and the signal line. Since high drive line 339 is connected to exhaust 330 and low and intermediate lines 334 and 336 exhaust at the other end of the valve, the three-speed and reverse unit 16 is in positive neutral and no drive is transmitted. In both reverse ratios the supply line 331 is connected between the lands $d$ and $e$, bore 228 and lands $e$ and $f$ to the reverse drive line 342 to establish reverse in the three-speed unit 16. In the first reverse ratio R1 the supply line 331 is also connected between the lands $d$ and $e$ to the direct drive line 332. Low line 334, intermediate line 336 and overdrive line 341 are connected to exhaust via port 229. In the second reverse R2, the main line is connected between the lands $d$ and $e$, bore 228 between the lands $e$ and $f$ to reverse line 342 and overdrive bypass line 346 which is connected through one-way check valve 347 to the overdrive line 341. When the selector valve is in the second reverse position, line 341 is connected around the land $a$ through the valve body.

Brake signal valve

The brake signal valve 351 includes a valve 352 having lands $a$ and $b$ located in a bore 353 of uniform diameter. The valve 352 is biased to the open position shown in which the brake signal line 354 is connected to exhaust 356 between the lands $a$ and $b$ by a spring 357 which engages the land $b$ and abuts against a piston 358 located in a cylinder 359. The poston 358 normally engages the end wall 361 of the cylinder 359. In fourth ratio when fluid is supplied to the overdrive line 341, the piston is moved until it engages the shoulder 362 to provide a greater spring biasing force. Thus, the upshift in fourth ratio occurs at a higher intermediate shaft speed than in third ratio to compensate for the upshift in the two-speed gear unit 14, so the upshift is at the same speed relative to the input. The valve 352 is upshifted by governor pressure supplied by line 216 to the end of the bore acting on land $a$ at excessive engine or input speeds. On upshift of valve 352 the main line 194 is connected between the lands $a$ and $b$ to the brake signal line 354. The land $b$ may have a smaller diameter than land $a$ to provide hysteresis.

Flow control valve

A flow control valve 366 is employed to supply a control fluid to the shift regulator valve 391. The flow control valve 366 has a valve element 367 having a large diameter land $a$ located in a large bore 368, and a small diameter land $b$ closely adjacent the land $a$ and a land $c$ spaced from the land $b$ of the same size located in small bore 369. The valve 367 is illustrated in the normal position blocking flow from the main line 194 to the ratio supply line 331. Under these conditions fluid will flow slowly through the orifice 371 to the ratio supply line and orifice 372 in the closure plate of the one-way check valve 373 to the end of the bore 368 to act on the land $a$. The main line pressure in line 194 also is normally connected by the annular port at the end of line 194 and the axial port 374 to the end of bore 369 to act on land $c$. Since the land $a$ is larger than the land $c$ and the pressure acting is equal, the valve will normally be moved to the position shown. In this position the ratio supply line 331 is connected to reset line 377 which controls the action of the shift regulator valve 391.

When the manual selector valve 221 is actuated to engage a new ratio, all the fluid employed to engage one of the fluid actuated ratio establishing devices will initially flow from the main line 194 through the orifice 371 to the line 331 and a disengaged ratio establishing device which will initially accept fluid at a low pressure causing a reduction in pressure in line 331 and in the bore 368 permitting the main line pressure acting via passage 374 on the end of land $c$ to move the valve to the open position. In this position the valve connects the reset line 377 to exhaust 378 to condition the trimmer or shift regulator valve 391 for operation. In both valve positions governor pressure line 216 is connected through flow valve 366.

Trimmer valve

Whenever the manual selector valve 221 is actuated to supply fluid to engage a fluid operated ratio establishing device, flow through the line 331 actuates the flow controlled trimmer or shift regulator valve 391 to initially limit the pressure employed to engage the fluid operated ratio establishing devices to a lower value and thereafter raise the pressure at a gradual rate of pressure increase to provide smooth ratio engagement. Then after the ratio establishing device has been fully engaged, the valve 391 increases the pressure rapidly to main line pressure to provide the normal excess pressure providing a safety factor to hold the ratio establishing device in full engagement during all phases of operation of the transmission. The valve 391 consists of a valve plug 392 and a hollow valve element 393 mounted in a bore 394. Valve 391 is shown in the normal position in FIGURE 1b in which a spring 396 abutting on the end wall 397 of the bore 394 biases the plug 392 and the valve element 393 to the right or initial position. The spring 396 is stronger than spring 405 between plug 392 and valve element 393 so spring 405 is compressed in this position. A stop 398 limits movement of the plug 392 to the left to time the duration of the pressure reduction and to prevent excessive compression of the spring 396. The ratio supply line 331 is normally connected by the branch line 399 to the end 401 of the bore 394 to act on the end wall 400 of valve element 393 and to flow through the orifice 402 in this end wall. Initially the plug 392 and the valve element 393 will be moved sufficiently to connect branch 399 to exhaust 403 to provide a substantial pressure reduction in line 331. The fluid flowing through orifice 402 after a predetermined time interval fills the cavity 404 within the valve element 393 and adjoining passage 406 to the check valve 407 and then additional fluid separates the valve element 393 from the plug 392 to, in effect, provide a longer composite valve element between the spring 396 and exhaust port 403. This action causes the spring to gradually act in an increasingly compressed condition and thus provides a gradually increasing biasing force and a gradually increasing pressure in line 331. When the plug 392 abuts the stop 398, the spring 405 moves the valve element to the right end 401 of the bore at a rate controlled by flow through orifice 402 to close exhaust 403. This action occurs in a predetermined time period determined by the amount of time required for the fluid at the controlled pressure to flow through orifice 402 to separate the plug 392 and valve element 393 sufficiently to close exhaust 403. Then the pressure in line 331–399 is quickly increased to the higher main line pressure regulated by regulator valve 196. The ratio supply line 331–399 has a branch 408 connected to the bore 394 between the exhaust 403 and the port 406 to prevent leakage from cavity 404 to exhaust 403.

Since rapid engagement of the overdrive ratio establishing device in the fourth ratio is desired, the overdrive supply line 341 is connected through the check valve 407, port 406 and the full flow ports 409 in the wall of valve element 393 to enter the cavity 404 to quickly separate plug 392 and valve element 393 to render valve 391 inoperative to provide any pressure reduction. A restriction may be provided in this connection from line 341 to cavity 404, as by restricted ports 409 to merely reduce the degree and duration of the pressure reduction. The reset line 377 supplies main line pressure from line 331 when there is no flow throug the lines 194 and 331 or when there is no ratio change in progress to reset the plug 392 and valve element 393 in the positions shown ready for another pressure reduction and gradual increase of pressure during a ratio engagement. When the ratio engagement occurs or in initiated, the flow control valve element 367 quickly moves to the left, exhausting line 377 to exhaust 378 to permit movement of the valve plug 392 as explained above.

Cooler pressure regulator valve

The cooler pressure regulator valve 411 limits the brake and cooler supply pressure. The cooler and brake feed regulator valve 411 has a valve element 412 located in a bore 413. The feed pressure urges the valve 412 in one direction from the closed position to the open position connecting feed line 218 to exhaust 418 against the biasing spring 416. Stop 421 limits movement. Exhausts 419 and 422 prevent fluid lock.

Brake valve

A brake valve 426 consists of a valve element 427 having equal lands $a$, $b$, $c$ and $d$ of equal diameter located in a bore 428. With the valve in the brake off position shown in FIGURE 1b, the brake outlet line 429 is connected between the lands $a$ and $b$ to the exhaust 431.

The brake and cooler supply line 218 is connected via a one-way check valve 433 and line 432 to port 435 of valve 426 which is blocked by land *b* and to the oil cooler 434. The cooler outlet is connected to the lubrication line 436. The brake inlet line 438 is blocked between the lands *b* and *c*. The brake supply line 218 is blocked between lands *c* and *d*. The lubricating line 436 is maintained at a low lubricating pressure by the relief valve 439 which is connected to a chamber 441 at the lower end of bore 428. A spring 442 in this chamber normally engages land *d* of the valve element to urge the valve element to the "brake off" position shown. The upper end of the valve bore 428 has a sealed closure 446 providing an expansible chamber between the valve body and land *a*. When fluid is supplied by the brake signal line 354 to this chamber, valve 427 is automatically moved to the "brake on" position.

When the valve element 427 is moved down to the "brake on" position, the brake outlet line 429 is connected between lands *a* and *b* to line 432, through the cooler 434 to the lubrication line 436. The brake supply line 218 is then connected around land *c* to the brake inlet line 438. The brake outlet line 429 and the supply line 218 are connected through the cooler 434 to the lubrication line 436. In addition to being connected to lubricate the transmission, the lubrication line 436 is connected via chamber 441 of the brake valve 426, around land *c*, to supply cool oil from the cooler 434 to the brake inlet line 438. Since the lubrication lines are restricted at the bearings, a large volume of fluid will flow from the lubrication lines to the brake valve. The lubrication fluid in chamber 441 also assists spring 442 in biasing the valve to the OFF position.

*Overlap valves*

The intermediate ratio line 336 has an overlap control valve 451 to provide fast fill of the fluid actuated ratio establishing devices and slow release. This valve has an orificed closure which is normally maintained in the closed position by a very light spring. Thus, on the supply of fluid to the fluid operated ratio establishing device to engage the ratio the valve opens providing full flow for fast engagement. However, on release the valve closes and a reduced flow through the orifice retards the disestablishment or disengagement of the ratio establishing device to prevent disestablishment of the intermediate ratios before the ratio being established has started establishment. Low ratio line 334 has an orifice 352 to provide slow establishment and disestablishment of low ratio.

*Operation*

When the engine is started, the engine drive front pump 187 supplies fluid at a pressure regulated by the pressure regulator valve 196 to the main line 194. Since the signal line 214 supplies a control pressure to reduce the main line pressure in neutral, first, second and third and fourth ratio drives, the main line pressure will be at a reduced value in those ratios and at a higher value in both reverse drives. The main line pressure is also reduced with increasing governor pressure and thus the main line pressure under all conditions of operation is gradually reduced with increasing vehicle speed, as explained in application S.N. 795,072, filed February 24, 1959.

The transmission may then be placed in the desired drive ratio by moving the manual selector valve 221 from the neutral position to any one of the drive ratio positions. In each drive ratio position fluid is supplied to engage a ratio establishing device in both the two-speed unit and the three-speed and reverse unit and to supply fluid to the signal line 214 in the ratios indicated by X in the above table.

Whenever a ratio establishing device is being established, the trimmer valve 391 initially limits the pressure to a low value and thereafter increases the pressure to a higher value for clutch or brake engagement and then quickly increases the pressure to main line pressure to prevent slipping during any excessive torque. Clutch or brake engagement from initial slipping engagement until slipping stops, is smooth due to the fact that the pressure increases at an increasing rate. Since it is desired that there be more overlap on a shift from direct to overdrive of the two-speed unit, the overdrive line 341 is connected through check valve 407 to disable or partially disable the pressure reducing action of the regulator valve 391. Whenever the selector valve is moved to engage a ratio establishing device, fluid is supplied from the main line 194 through orifice 371 to the ratio supply line 331 creating a differential pressure to cause the flow valve 366 to be moved to the left or exhaust position. Valve element 367 will move to the exhaust position quickly since bore 368 is exhausted quickly when check valve 373 opens. The reset line 377 will then be disconnected from line 331 and vented to exhaust 378 permitting the shift regulator valve 391 to function.

The shift regulator valve 391 controls the pressure employed to engage the ratio establishing devices during the shift cycle. The ratio supply pressure in line 331 is connected via the branch 399 to act on the valve element 393 and this pressure moves this valve element together with the plug 392 against the biasing force of the spring 396 to exhaust fluid at exhaust 403 to regulate the pressure at an initial low value for soft clutch or brake engagement. At the same time fluid flows through the orifice 402 to fill the chamber 404 and with the assistance of spring 405 separates the plug 392 and valve element 393 and thus gradually increases the biasing force of spring 396 and the pressure supplied by line 331 to the ratio engaging device. The pressure is increased during a predetermined time interval determined by the time that fluid flowing through the orifice 402 moves the plug 392 to engage the stop 398. When this happens further flow of fluid through orifice 402 assisted by the action of the spring 405 further separate valve element 393 from the plug 392 to close the exhaust 403 and terminate the regulating cycle of the valve 391 and to maintain full line pressure in line 331. At this time the flow from main line 194 to ratio supply line 331 also ceases and the pressure equalizes on the opposite ends of valve element 367 permitting the larger force on the larger area of land *a* as compared to the force on small land *c* to return the valve to the supply position shown. The valve element 367 returns slowly since the fluid moving the valve must flow through the orifice 372. In this position main line pressure is supplied through orifice 372 in check valve 373, bore 368 of valve 366 to the reset line 377 to slowly reset valve 391 in a predetermined time. A predetermined time interval after the shift is completed, the flow valve returns to the open position to supply fluid to the reset line which supplies fluid to the spring chamber portion of bore 394 of the valve 391 and acts to return the plug 392 to the normal position shown. This pressure supplied by the reset line is able to overcome the ratio supply pressure 331 acting on the other end of valve element 393 due to the assistance of the spring 396 which is stronger than the spring 405.

The brake supply pressure in line 218 rises with increasing pump speed due to the fact that the pumps provide an increasing volume of fluid with increasing speed. During the normal operation of the transmission, a constant volume of oil is used. Thus, a major portion of the volume of fluid supplied by pumps 187 and 190 is exhausted to the brake supply line and passes through the constant restriction of the oil cooler. This increasing volume of flow against the cooler restriction provides an increasing pressure with increasing speed. The pressure thus increases with increasing speed while the main line pressure decreases with increasing speed. If this relationship were permitted to continue to the maximum speed, the brake supply pressure would exceed the main line pressure. To avoid this type of operation, the governor pressure increase is limited by the relief valve 217 and thus the main line pressure reduction is limited. It is also necessary to limit the rise in cooler pressure so that it does not rise above a safe pressure limit with cold oil. This is accomplished by the cooler pressure regulator valve 411 which limits cooler outlet pressure to a safe value.

When the hydrodynamic brake valve 426 is in the position shown, the brake outlet 429 originating at the radially outermost portion of the brake chamber 104, where the centrifugal effect of the vanes 103 forcefully discharges the fluid at a high pressure, is connected to the exhaust 431 and thus evacuates the brake chamber so that there is no braking effect. To apply the brake, the valve element 427 is moved down against the action of spring 442 and lubricating fluid in chamber 441 to block the exhaust 431 and connect the lubricating fluid in chamber 441 and the brake supply line 218 to the brake inlet line 438 to fill the brake chamber at a point nearer the center at a lower pressure. At the same time the brake outlet line 429 is connected via port 435 to the line 432 which is connected through the oil cooler 434 to the lubricating line 436. During normal brake operation, the high brake outlet pressure closes valve 433. The lubrication line 436 is connected to the brake valve 426 to supply the brake inlet 438 with cooled oil.

Whenever the load is dropped from a turbine engine, particularly the type of gas turbine engine having a separate power output turbine, the speed of the power turbine can rise suddenly to dangerous speeds. This may occur during the brief period that the load is disengaged by the transmission or during downhill driving or because of engine speed governor failure or slow response. In order to prevent this condition, a governor force proportional to input speed or turbine engine speed is employed to control the supply of main line pressure to automatically actuate the brake control valve to engage the hydrodynamic brake whenever engine speed rises above the predetermined maximum operating speed. The governor pressure from the Pitot tube governor 159 is connected by line 216 to act on the land $a$ of valve element 352 of the brake signal valve 351. In splitter low ratio, the governor pressure is proportional to the input speed. The brake signal valve shifts at the same input speed when the splitter high unit is in high ratio by changing the biasing force acting on the brake signal valve. The pressure which engages the splitter high brake is also supplied in line 341 to actuate the piston 358 to move it from the position shown to the position engaging shoulder 362 to change the biasing force of spring 357 so that when the splitter unit is operating in high and the Pitot governor 159 operating at a faster speed supplying a higher pressure, the brake signal valve will shift at the same engine or input speed as it does in low ratio. When the brake signal valve shifts to the open position, the main line 194 is connected to the brake signal line 354 to enter the actuating chamber between seal 446 and land $a$ of valve element 427 of the brake control valve 426 to automatically move the brake control valve from the "off" position to the "on" position to engage the hydrodynamic brake.

The above described preferred embodiments are illustrative of the invention and it will be appreciated that they may be modified in accordance with the scope of the appended claims.

We claim:

1. In a power plant, a turbine engine having an output, a multiratio transmission including a hydrodynamic brake driven by said engine output, said transmission having a plurality of ratio establishing devices, a source of fluid under pressure, shift control means operatively connected to said ratio establishing devices for selectively actuating said ratio establishing devices to selectively establish the ratios of said multiratio transmission, governor means operatively connected to said turbine output responsive to turbine output speed, brake control means connected to said source and said hydrodynamic brake having a brake on position connecting said source to said hydrodynamic brake to engage said brake and a brake off position draining said hydrodynamic brake to disengage said brake, and control means operatively connected to said governor means and brake control means operative in response to said governor operative at a speed in excess of the normal operating speed of said turbine engine to actuate said brake control means to move said brake control means to said brake on position.

2. In a multiratio transmission including a hydrodynamic brake, said transmission having a plurality of ratio establishing devices, a source of fluid under pressure, shift control means operatively connected to said ratio establishing devices for selectively actuating said ratio establishing devices to selectively establish the ratios of said multiratio transmission, governor means operatively connected to said transmission and responsive to transmission input speed, brake control means connected to said hydrodynamic brake and said source having a brake on position connecting said source to said hydrodynamic brake to engage said brake and a brake off position draining said hydrodynamic brake to disengage said brake, and control means operatively connected to said governor means and said brake control means responsive to said governor means operative at a speed in excess of the normal operating speed to actuate said brake control means to move said brake control means to said brake on position.

3. In a multiratio transmission including a hydrodynamic brake, said transmission having a plurality of ratio establishing devices, a source of fluid under pressure, shift control means operatively connected to said source and said ratio establishing devices for selectively actuating said ratio establishing devices to selectively establish the ratios of said multiratio transmission, governor means operatively connected to said transmission and responsive to transmission input speed, brake control means connecting said source to said hydrodynamic brake and having a brake on position connecting said source to said hydrodynamic brake to engage said brake and a brake off position draining said hydrodynamic brake to disengage said brake, manual control means operatively connected to said brake control means to actuate said brake control means and automatic control means operatively connected to said governor means and said brake control means responsive to said governor means operative at a speed in excess of the normal operating speed to actuate said brake control means to move said brake control means to said brake on position.

4. In a power plant, an engine, a multiratio transmission including a hydrodynamic brake driven by said engine, said transmission having a plurality of fluid operated ratio establishing devices, a source of fluid under pressure, shift control means operatively connecting said source to said ratio establishing devices for selectively connecting said source to said fluid operated ratio establishing devices to selectively establish the ratios of said multiratio transmission, governor means operatively connected to said engine and responsive to engine output speed, a brake control valve connecting said source to said hydrodynamic brake and having a brake on position connecting said source to said hydrodynamic brake to engage said brake and biased to a brake off position draining said hydrodynamic brake to disengage said brake control, and control means operatively connected to said governor means and said brake control valve responsive to said governor means operative at a speed in excess of the normal operating speed to actuate said brake control valve to engage said hydrodynamic brake.

5. In a multiratio transmission including a hydrodynamic brake, said transmission having a plurality of fluid operated ratio establishing devices, a source of fluid under pressure, shift control means operatively connecting said source to said ratio establishing devices for selectively connecting said source to said fluid operated ratio establishing devices to selectively establish the ratios of said multiratio transmission, governor means operatively connected to said transmission responsive to transmission speed, a brake control valve operatively connected to said source and said hydrodynamic brake having a brake on position connecting said source to said hydrodynamic brake to engage said brake and biased to a brake off position draining said hydrodynamic brake to disengage said brake control, and control means operatively connected to said governor means and said brake control valve responsive to said governor means operative at a speed in excess of the normal operating speed to actuate said brake control valve to engage said hydrodynamic brake.

6. In a power plant, an engine, a multiratio transmission including an hydrodynamic brake driven by said engine, said transmission having a plurality of fluid operated ratio establishing devices, a source of fluid under pressure, shift control means operatively connected to said source to said ratio establishing devices for selectively connecting said source to said fluid operated ratio establishing devices to selectively engage the ratios of said multiratio transmission, governor means operatively connected to said engine and responsive to engine output speed, a brake control valve operatively connected to said source and said hydrodynamic brake having a brake on position connecting said source to said hydrodynamic brake to engage said brake and biased to a brake off position draining said hydrodynamic brake to disengage said brake and having a manual control means connected to said brake control valve and control means operatively connecting said governor means and said brake control valve responsive to said governor means operative at a speed in excess of the normal operating speed to move said brake control.

7. In a power plant, a turbine engine, a multiratio transmission including a hydrorynamic brake driven by said engine, said transmission having a plurality of fluid operated ratio establishing devices, a source of fluid under pressure, shift control means connected to said source and said ratio establishing devices for selectively connecting said source to said fluid operated ratio establishing devices to selectively establish ratios of said multiratio transmission, governor means operatively connected to said engine responsive to engine output speed, brake control valve means connecting said source and said hydrodynamic brake having a brake on position connecting said source to said hydrodynamic brake to engage said brake and biased to a brake off position draining said hydrodynamic brake to disengage said brake and having a manual control means operatively connected to said brake control valve means for manual operation of said brake valve means and control means operatively connected to said governor means and said brake control valve means responsive to said governor means operative at a speed in excess of the normal operating speed to move said brake control valve to said brake on position.

8. In a power plant, a turbine engine, a multiratio transmission including a hydrodynamic brake driven by said engine, said transmission having a plurality of fluid operated ratio establishing devices, a source of fluid under pressure, shift control means connected to said source and said ratio establishing devices for selectively connecting said source to said fluid operated ratio establishing devices to selectively establish the ratios of said multiratio transmission, governor means operatively connected to said engine and responsive to engine output speed, brake control valve means operatively connected to said source and said hydrodynamic brake having a brake on position connecting said source to said hydrodynamic brake to engage said brake and biased to a brake off position draining said hydrodynamic brake to disengage said brake and having a manual control means operatively connected to said brake control valve means for actuating said brake valve means and brake valve control means operatively connected to said brake control valve means operative to move said brake control valve to said brake on position, and control means operatively connected to said governor means and said brake valve control means responsive to said governor operative at a speed in excess of the normal operating speed to actuate said brake valve control means to move said brake control valve to said brake on position.

9. In a multiratio transmission including a hydrodynamic brake, said transmission having a plurality of fluid operated ratio establishing devices, a source of fluid under pressure, shift control means connected to said source and said fluid operated ratio devices selectively connecting said source to said fluid operated ratio establishing devices to selectively establish the ratios of said multiratio transmission, governor means operatively connected to said transmission responsive to transmission speed, a brake control valve connected to said source and said hydrodynamic brake having a brake on position connecting said source to said hydrodynamic brake to engage said brake and biased to a brake off position draining said hydrodynamic brake to disengage said brake and having a manual control means operatively connected to said brake control valve for manually operating said brake control valve and brake valve control means operatively connected to said brake control valve operative to move said brake control valve to said brake on position, and control means operatively connected to said governor means and said brake valve control means responsive to said governor means operative at a speed in excess of the normal operating speed to actuate said brake valve control means to move said brake control valve to said brake on position.

10. In a power plant, a turbine engine, a multiratio transmission including a hydrodynamic brake driven by said engine, said transmission having a plurality of fluid operated ratio establishing devices, a source of fluid under pressure, shift control means connected to said source and said ratio establishing devices for selectively connecting said source to said fluid operated ratio establishing devices to selectively establish the ratios of said multiratio transmission, governor means operatively connected to said engine responsive to engine output speed, a brake control valve connected to said source and said hydrodynamic brake having a brake on position connecting said source to said hydrodynamic brake to engage said brake and biased to a brake off position draining said hydrodynamic brake to disengage said brake and having a manual control means operatively connected to said brake control valve for manually actuating said brake control valve and a brake valve fluid operated control means operatively connected to said brake control valve operative to move said brake control valve to said brake on position, and control means operatively connected to said source and said brake valve fluid operated control means responsive to said governor operative at a speed in excess of the normal operating speed to connect said source to said brake valve fluid operated control means to move said brake control valve to said brake on position.

11. In a multiratio transmission including a hydrodynamic brake, said transmission having a plurality of fluid operated ratio establishing devices, a source of fluid under pressure, shift control means operatively connecting said source and said ratio establishing devices for selectively connecting said source to said fluid operated ratio establishing devices to selectively establish the ratios of said multiratio transmission, governor means operatively connected to said transmission for response to transmission input speed, a brake control valve connected to said source and said hydrodynamic brake having a brake on position connecting said source to said hydrodynamic brake to engage said brake and biased to a brake off position draining said hydrodynamic brake to disengage said brake and having a manual control means operatively connected to said brake control valve for manually actuating said brake control valve and a brake valve fluid operated control means operatively connected to said brake control valve operative to move said brake control valve to said brake on position, and control means operatively connected to said governor means, said source and said brake valve fluid operated control means responsive to said governor means operative at a speed in excess of the normal operating speed to connect said source to said brake valve fluid operated control means to move said brake control valve to said brake on position.

12. In a multiratio transmission, drive means adapted to be driven by an engine, driven means, multiratio gear means for providing a plurality of ratio drives operatively connecting said drive means to said driven means, shift control means connected to said multiratio gear means for establishing the drive ratios, brake means connected directly to said drive means, governor means connected to said drive means, brake control means connected to said governor means and said brake means for applying said brake means when said governor means indicates that said drive means is rotating at a predetermined speed above normal operating speed to limit the speed of said drive means.

References Cited by the Examiner
UNITED STATES PATENTS

| | | | |
|---|---|---|---|
| 2,591,540 | 4/52 | Grylls | 188—90 X |
| 2,827,989 | 3/58 | Christenson. | |
| 2,953,940 | 9/60 | Slemmons | 74—472.1 |
| 2,961,078 | 11/60 | Shannon et al. | 192—4 |
| 2,990,919 | 7/61 | Christenson et al. | |

DON A. WAITE, *Primary Examiner.*